Jan. 30, 1968   A. W. FRANCIS, JR., ET AL   3,366,331
COMBUSTION CONTROL

Filed May 3, 1965   2 Sheets-Sheet 2

INVENTORS.
ALEX W. FRANCIS JR.
ROBERT W. COGGINS
JAMES O. BROWN
BY Arthur L. Wade
ATTORNEY

United States Patent Office 3,366,331
Patented Jan. 30, 1968

3,366,331
COMBUSTION CONTROL
Alex W. Francis, Jr., Robert W. Coggins, and James O. Brown, Tulsa, Okla., assignors to Combustion Engineering, Inc., New York, N.Y., a corporation of Delaware
Filed May 3, 1965, Ser. No. 452,779
2 Claims. (Cl. 236—25)

The present invention relates to control of the combustion of a steam generator to produce steam with a desired vapor-liquid ratio. More particularly, the invention relates to controlling the fuel supplied to the combustion of the generator to compensate for changes in the fuel conditions and progressive deterioration of the fuel regulating element.

For the past several years, various major oil producing organizations in this country have been experimenting with the use of heat of vaporization available from steam to accomplish a greater recovery of oil from producing reservoirs. The techniques in the use of steam have not settled into a narrow pattern. Pressures used are varied from 150 pounds per sq. in. to 2,500 pounds per sq. in. Further, higher pressures will probably be used in the future.

The quantities of steam required have varied from 3,000 pounds per hour to 25,000 or 30,000 pounds per hour into each input well. The characteristics of the producing reservoir associated with each installation have dictated the pressure and quantity of the steam employed for the recovery process.

The past art of generating steam for many purposes has long been extensively developed. Many of those old techniques of steam generation are utilized in producing steam for this new purpose. However, there are specifications for the new purpose which present unique challenges to both those skilled in the art of steam generation as well as those skilled in the art of oil production.

This new tool for increasing oil recovery is limited by the availability of water and/or the economic considerations of treating the water from which the steam must be generated. The water available in and near the oil fields usually requires extensive treatment before it is suitable to be converted into steam. It is most important that the solids which are in solution in the water be identified and properly handled during the generation of the steam and injection of the steam into the oil bearing earthen formation.

There are many different kinds of solids in available water used to generate steam for this new purpose. The majority of the solids which will deposit out as scale are the calcium and magnesium compounds. In general, it is desirable to replace the ions of calcium and magneisum with sodium ions. This replacement is one of the fundamental techniques of water treatment.

Once the calcium and magnesium ions have been replaced with sodium ions, the amount of water required to keep such material in solution can be drastically reduced. Temperature and pressure must be carefully considered, but, in general, sodium salts will remain in solution rather than deposit as scale with much less water than required to keep calcium and magnesium compounds in solution. The ratio of the steam to the actual water discharged from a generator is called "steam quality."

It is a fundamental problem to generate steam from as much of any given amount of water as possible (high quality). A maximum amount of heat from a minimum amount of water is desirable as a force for the thermal drive in this oil production technique. Therefore, it is desired to convert as much water as possible to steam (high quality), retaining only enough water to keep the solids in the water dissolved.

In the generation of heat for the water being converted to steam, control of the fuel flowing to the combustion offers a unique challenge in oil field installations using crude oil as the fuel. This oil often contains material which will cut out the elements of a regulating valve in the line conducting the fuel to the burner. The pressure drop across the fuel valve may change. The viscosity of the fuel itself may change. The position of the valve will gradually become an erroneous guide to the quantity of fuel flowing to the combustion. A system is required to release the desired quantity of heat absorbed by the water so the quality of the steam produced will be at the desired value.

It is a principal object of the invention to regulate the quantity of fuel to a combustion process in accordance with the quantity of water supplied to absorb the heat of the combustion process.

Another object is to regulate the fuel and air rate in parallel from the water rate.

Another object is to provide means for varying the ratio between the water rate and heat released to adjust the quality of the steam generated.

The present invention contemplates control of the fuel and air to a combustion process of a steam generator from the rate of water supplied the generator. The water rate is measured by a meter which is arranged to generate a signal representative of the water rate. The water rate signal is then applied to the regulators of fuel and air rates in parallel. The fuel rate regulator is also adjusted by an actual measurement of fuel flow; the fuel rate is measured and a signal developed which is representative of the fuel rate and this signal is then compared with the water rate signal and their difference applied to the fuel regulator. The result is a heat release, matched with the water absorbing the heat, to produce steam of the desired quality.

Other objects, advantages and features of this invention will become apparent to one skilled in the art upon consideration of the written specification, appended claims, attached drawings; wherein:

Figure 1:
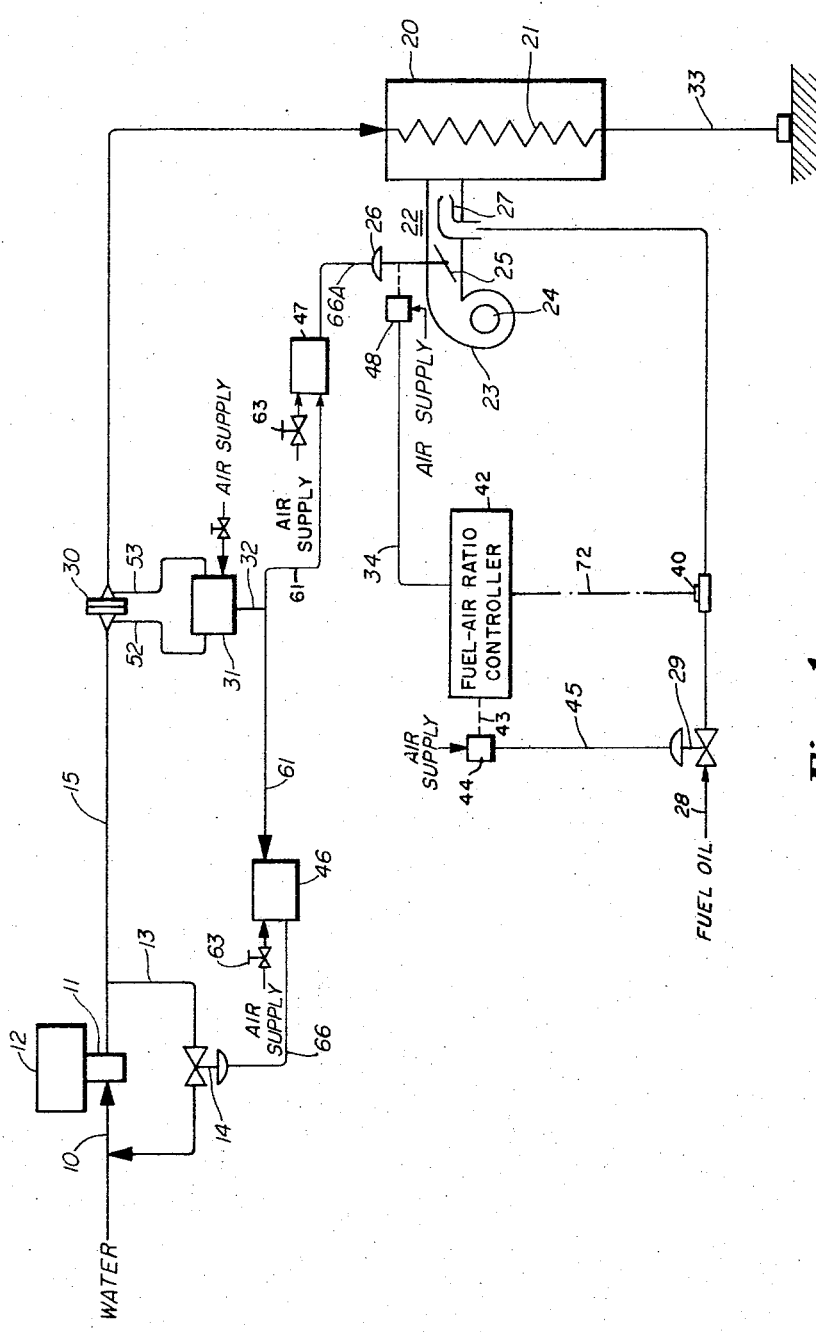
FIG. 1 is a diagrammatic representation of a steam generator and control for combustion embodying the present invention.

Referring to FIG. 1, there has been illustrated, in diagrammatic form, part of a system for generating steam to inject in an oil well. The preparation of water to convert into steam is not considered here. Essentially, water is simply indicated as available from a source not shown. The water is fed to a furnace, or generator, to be converted into steam and then injected into the earth formation of a well. The injection system is not considered here, any more than is the treatment system for the water. The disclosure here is of the control system which regulates the water flowing into the generator and the fuel and air flowing to the burner equipment of the generator.

The regulation of the water to the generator, and the fuel and air to the generator burner, can take many specific forms. The invention is not limited to any specific form for this direct regulatory structure, certainly not the specific form illustrated in the drawings.

Water regulation

In FIG. 1 water comes from a source, prepared by a system not shown, through a conduit 10. The water is supplied to the generator, at a desired pressure, by a pump 11. A motive power source for this pump is indicated at 12.

Generally, it is mechanically desirable to operate the pump and power source at a constant speed, or substantially constant speed. Therefore, to vary the rate of water supplied the generator, a by-pass conduit 13 is installed around the pump 11 and a modulating valve 14 is mounted in this conduit 13. The final result of this arrangement is that any specific opening of valve 14 will determine the rate at which water will flow from conduit 10 into conduit 15. One of the functions of the control system disclosed is to establish the rate of water flow to the generator by modulating the position of valve 14. Obviously this valve 14 can be operated by any force available as an output of the control system in which the invention can be embodied. In FIG. 1, valve 14 is indicated as having a diaphragm operator responding to fluid pressures from the control system; an electric, or other, system is also feasible.

Burner regulation

The steam generator is, in principle, quite simple. These mechanical arrangements for heat exchanging the water with products of combustion may take varied forms. To give sufficient illustration for the purposes of the present disclosure, the generator is simply indicated as an enclosure 20 within which a heat exchanger section of conduits 21 is extended between the entrance and exit of the generator. The products of combustion from the combustion system are brought into physical contact with the section 21 and the result is a conversion of water in the section into steam.

The combustion section 22 for the generator comprises an air supply and a fuel supply. More specifically, air is forced into a conduit 23 by an attached blower 24. The details of the blower are not shown, nor the source of power for rotating the blower. The important feature, at this point in the disclosure, is the regulation of the air supplied conduit 23 from blower 24.

As with the regulation of water from conduit 10 to conduit 15, the air through conduit 23 is controlled by a valve. This valve, in conduit 23, may take the form of the simple damper 25 which is disclosed as mechanically moved and positioned by an operator 26. The final result of the arrangement is that any specific opening of damper 25 will determine the rate at which air will flow through conduit 23 to the combustion chamber of the burner. Operator 26 receives a signal to position damper 25 from the control system in which the invention is embodied.

Setting the air flow rate is only one side of the combustion regulation picture. The fuel flowing to the burner in this system must also be controlled. The present custom is to directly control the air and cause the fuel to follow the air.

Fuel is indicated as flowing to the burner 27 through conduit 28 from a source not shown. Valve 29 in conduit 28 is positioned to regulate the flow of fuel oil through the conduit.

Gas has less problems in combustion than oil. However, gas is usually quite expensive compared to oil. Gas does burn cleanly, mixes readily with air and is easily controlled. But, if gas is not naturally produced in the locality where these steam generators are used, the expense of importing it can be a large economic factor in this use of steam to stimulate oil production.

The best answer to the fuel problem appears to lie with crude oil, the very production of the wells being stimulated with steam, or other wells in the same area. However, burning this crude oil is a problem. Sand, and other solids, in produced crude oil not only cut the parts of burner 27 but also the regulating elements of valve 29. A worn burner creates problems, but worn regulator parts, cut out by sandy oil, will lose their original relation between their position and the rate of oil flowing through their valve.

For the purposes of the present disclosure, the air is indicated as drawn into conduct 23 by blower 24 and mixed with fuel brought to the burner 27 by conduit 28. The fuel is presumed to be oil, oil with sand which cuts and damages the regulator. The control over the fuel is important and regulation of the fuel is by the positioning of valve 29 with the control system embodying the invention.

Measurement and control

The process is supplied water through conduit 10 to produce steam. Not all of the product discharged from the generator is steam. As previously indicated, a predetermined percent of the water is retained in the product to maintain the solids of the water in solution.

The measurement of the water supplied the generator is simple. Of the numerous devices responsive to the rate of liquid flowing in a conduit, the orifice meter is probably the better known. An orifice in conduit 15 is indicated at 30. The differential pressures developed across orifice 30 are supplied to a bellows system in the instrument 31. The resulting force of the bellows system is then applied to actuate a fluid pressure pilot valve and produce a fluid pressure on the output of the unit 31. This output signal in the form of a fluid pressure transmitted by pipe 32 from unit 31 and can be used to generate a visual indication of the flow rate of water through conduit 15 and/or exert a control function in the system in which the invention is embodied.

The steam, and residual water, discharged from heat exchange section 21 of the generator is received in conduit 33. One of the variables of the discharged steam from the generator is its quality. If the rate of water supplied through conduit 15 is held at a predetermined value and the heat exchange in generator 20 is maintained at a predetermined rate, the quality of the steam discharged will be maintained and at a predetermined value. Broadly, control of this quality requires no more than regulating the water rate input and adjusting the fuel and air to the burner in parallel. However, this neat concept breaks down if the adjusting of the fuel valve 29 over its range of movement does not give expected values of fuel oil rate for each valve setting within the range. If sand, or other foreign matter, in the fuel oil wears the regulating parts of the fuel oil valve 29, the actual rate of fuel oil delivered will change at any particular valve setting. The present invention is embodied in means to actually measure the fuel oil rate and compare this rate with the rate of air. Any difference in these ratios from that desired for the particular water flow rate established to meet demand will cause the valve in the oil line to be moved in either direction until the desired rate of oil is obtained.

The present invention provides a complete servo loop responsive to the signal in pipe 32. This water rate signal moves air damper 25 to generate a fluid pressure in pipe 34 which is representative of the damper 25 position. The fuel flow rate in conduit 28 goes through turbine meter 40 which generates an electric signal representative of fuel flow rate in conduit 28.

Fuel-air ratio controller 42 compares these two signals and if they are not of the magnitudes to establish a desired ratio, a mechanical connection 43 is actuated. Mechanical connection 43 actuates a transducer 44 to develop an air pressure signal in pipe 45 for the operator of valve 29. Valve 29 is then positioned to establish the heat release in generator 20 which is required to turn the water in heat exchange section 21 into the required amount of steam.

Adjustments

The disclosed system has been provided with various adjustments which gives it flexibility. The water flow rate signal of pipe 32 is applied, in parallel, to the simultaneous control of the water flow rate and the combustion rate. However, ratio unit 46 fixes the portion of the water rate signal applied to valve 14 and unit 47 performs a similar function for air damper operator 26.

The water flow rate through conduit 15 can therefore be set by hand as desired and unit 46 will maintain the rate selected. The air flow rate through conduit 23 can be set by unit 47 for the fuel to follow and establish the heat release desired for the water supplied.

Further along in the system, unit 48 is adjustable to establish the range of output pressure in pipe 34 representative of the range of mechanical movement by operator 26. Also, transducer 44 can be adjusted to give the desired relation between the mechanical motion of 43 and the fluid pressures in pipe 45.

All the foregoing adjustments are to the same end, provision that the proper amount of heat will be released to convert the desired amount of water into steam. Further, the fuel and air are provided a ratio for their rates which will maintain a high efficiency of combustion while the desired amount of heat is being released.

Differential pressure cell

The various instruments with which the flexibility of adjustments are provided have well-known commercial forms in most cases. The essential elements of the instruments can be illustrated diagrammatically. The subsequent drawing figures are used to explain the function of the instruments as units and as parts of the complete system for combustion control.

Instrument 31 was referred to as responsive to the differential across orifice 30. This is a simple instrument, commercially available in several forms. However, to make the disclosure complete, FIG. 2 is used to disclose the basic structure of such devices.

Figures 2, 3:
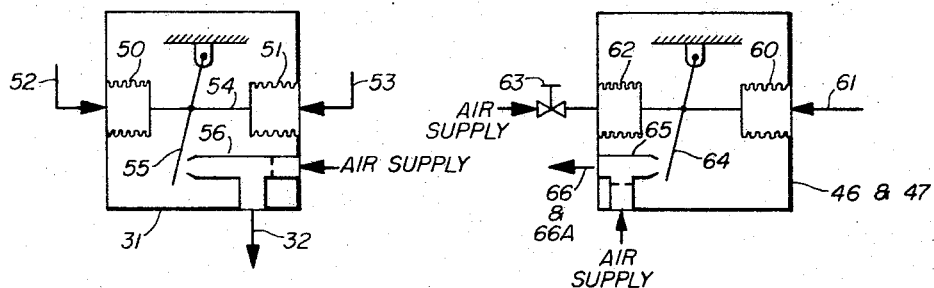
FIG. 2 is a diagrammatic representation of an instrument responsive to the differential pressure across an orifice in the water conduit to the steam generator of FIG. 1.
FIG. 3 is a diagrammatic representation of an instrument used to receive a fluid pressure signal in the control system of FIG. 1 and generate a different fluid pressure signal.

In FIG. 2 the unit 31 is shown as having a case in which bellows 50 and 51 are mounted. The two pressures across orifice 30 are conducted into bellows 50 and 51 with pipes 52 and 53. The movable walls of these bellows are linked by member 54. The position of member 54 is determined by the difference in the pressures within bellows 50 and 51, and this member is connected to pivoted flapper 55 so the movement of the free end of the flapper will be in accordance with the flow of water through conduit 15.

Nozzle 56 is supplied fluid pressure and the movement of the free end of flapper 55, relative the discharge of the nozzle, determines the back pressure in pipe 32. Therefore, the fluid pressures in pipe 32 are established in accordance with the differential pressures across orifice 30. It can then be stated that the pressures established in pipe 32 represent the rate of water flow through conduit 15.

Ratio controllers

Instruments 46 and 47 were referred to as units which each received one range of pressures as an input and developed another range of pressures as an output. The range of outputs are adjustable manually.

FIG. 3 shows one of the units with an internal arrangement similar to that of FIG. 2. Two bellows are arranged to pivot a flapper which sets the back pressure of a nozzle as the output. More specifically, bellows 60 receives the pressure of pipe 61 as an input. Bellows 62 receives a fluid pressure from a supply as set by manual valve 63. The difference between these pressures moves pivoted flapper 64 relative nozzle 65. The output of nozzle 65 is established in pipe 66 (66A).

The range of pressures in pipe 61 are related to the range of pressures in pipes 66 and 66A as determined by the pressure manually determined by valve 63. Therefore, the rate at which water is supplied to the generator 20 is controlled at instrument 46. The rate at which heat is supplied is controlled at instrument 47. The quantity of steam generated is therefore established and maintained while the quality of this steam is independently established and maintained.

Fuel-air ratio controller 42

The foregoing consideration of the combustion control system has brought the disclosure down to the specific fluid pressure control signal in pipe 66A which is applied to positioning operator 26. The fluid pressures of pipe 66A can be applied to the diaphragm and resist a spring over a range of operator movement. Of course it is also possible to use a positioner to respond to these pressures and use an auxiliary source of fluid pressure to give more positive positioning of the operator over a range of movement. In either event, a damper system 25 is thereby positioned in passage 23 to set the air flow rate to the combustion process.

Figure 4:
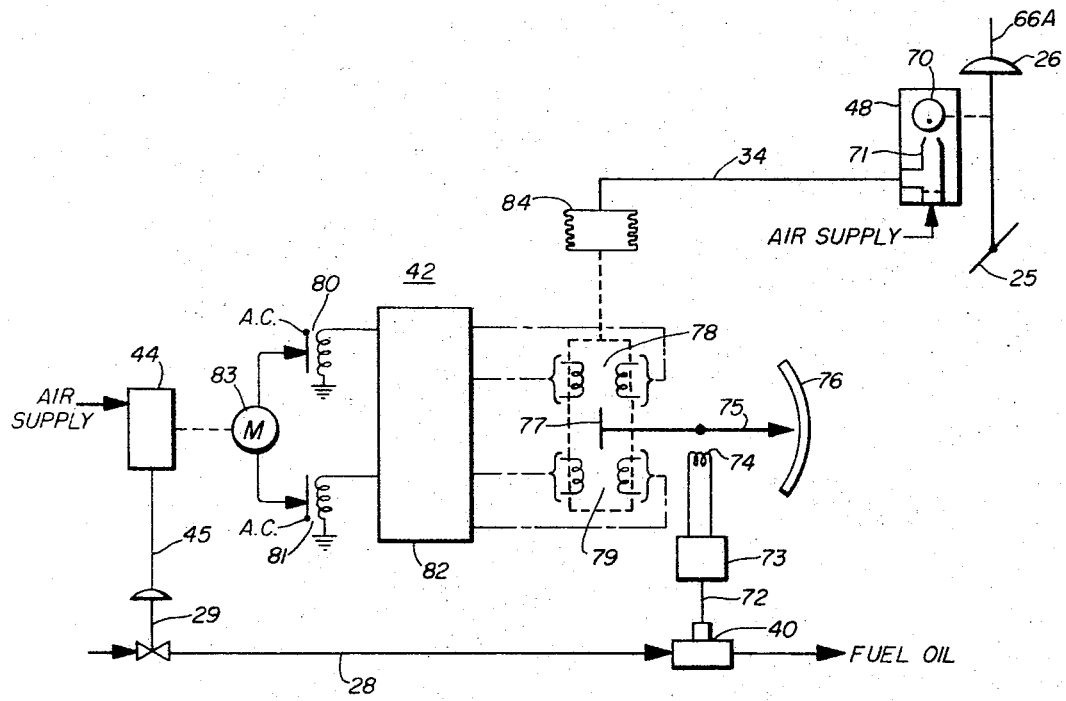
FIG. 4 is a diagrammatic representation of the portion of the system of FIG. 1 which controls the fuel to the combustion of the steam generator.

When the operator 26 is positioned, not only is the damper 25 positioned, but motion-to-fluid pressure transducer unit 48 is positioned. Unit 48 may take any of several well-known forms, but all these forms may be represented by the structure in FIG. 4.

Unit 48 may take the form of a cam 70, mechanically linked to operator 26. The cam 70 is rotated as operator 26 is positioned, the edge of the cam being shaped to change the output of a nozzle 71 over a predetermined range. Nozzle 71 is the conventional device supplied from a source of fluid and creating a back pressure in output pipe 34. The edge of the cam 70 approaches and retreats from nozzle 71 to vary the back pressure. It is, of course, feasible to have cam 70 actuate linkage which has a member cooperating with nozzle 71 as a flapper. The results are the same, the output presures of pipe 34 are representative of the position of operator 26 and, therefore, the rate of air flow to the combustion.

The fluid pressures of pipe 34 are conducted to controller 42 for comparison with a signal representative of the actual rate of fuel flow to the combustion. A turbine meter 40 represents a device which primarily responds to this actual rate of flow in conduit 28 and generates an initial signal. The signal is usually in the form of electrical impulses which are generated at a frequency dependent upon the rate of fuel flow in conduit 28.

The frequency signals are conducted by connection 72 to an instrument 73 which converts them to a direct current in coil 74.

Coil 74 is arranged to establish an electromagnetic field which positions a pivoted arm 75. Arm 75 can be used to indicate on scale 76 the value of the direct current-frequency-fuel flow rate signal of meter 40. Also, arm 75 can position an armature 77 which can generate a signal to control the fuel flow through conduit 28.

Armature 77 is arranged relative to two sets of coils so as to short out the electromagnetic field linking the coils of each set. The armature is swung between the coils of sets 78, 79 selectively, depending upon whether the flow of fuel through meter 40 increases or decreases from a predetermined value. The coil sets 78, 79 are arranged in circuit with switches 80, 81 through the circuit in unit 82 so that if armature 77 is moved between the coils of set 78, switch 80 is opened; if 77 is between the coils of set 79, switch 81 is opened.

Motor 83 is controlled in rotation by switches 80, 81. Depending upon the direction motor 83 is rotated, transducer 44 generates a fluid pressure in pipe 45 which increases or decreases. This signal positions valve 29 to increase or decrease fuel flow in conduit 28.

The fluid pressure signals of pipe 34 are conducted to controller 42 and placed upon bellows 84. This bellows is mechanically linked to coil sets 78, 79 so the coil sets will be moved together along the path traveled by armature 77. Therefore, the water flow rate, as represented by the signals in pipes 61 and 66A, demands both and air flow rate and the fuel flow rate. The demand signal for the fuel is continuously and automatically compared with a signal representative of the fuel actually flowing to the combustion. If there is a difference between the fuel demand and the actual fuel flow, the fuel flow regulator is adjusted to equalize the two signals. Actually, a servo loop is formed between fuel measurement and fuel regulation. A demand for the fuel is placed on this loop and the loop locks in on the rate of fuel to insure that enough fuel is supplied to satisfy the demand.

*Need for the invention*

It is very important that the fuel-air ratio be maintained within certain limits. Certainly it is important that excess fuel be avoided.

If sandy oil cuts the parts of regulator valve 29, excess fuel will flow to the combustion without the present invention. This excess fuel will cause coking in furnace 20. Many detrimental effects result from coking. Hot spots develop on the water-steam tubes 21, tending to cause their failure. Also, the passage available to pass air through furnace 20 becomes restricted. The back pressure on blower 24 increases. The ratio of air to fuel goes further out of balance with increasing excess fuel. More coking results and the cycle continues, snowballing the detrimental effects on efficient combustion. Therefore, it is vital that control of fuel oil be maintained and the present invention is directed toward this end.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention, having been described, what is claimed is:

1. A combustion control system including,
a steam generator supplied with water which is converted into steam when heated in the generator by combustion in the generator,
a meter arranged to respond to the rate of water supplied the generator by establishing a first fluid pressure output signal,
an air regulator for combustion air connected to the first fluid pressure output signal to be positioned within a predetermined range,
a fluid pressure signal generator mechanically connected to the air regulator to establish a second fluid pressure signal representative of the position of the air regulator,
a meter arranged to respond to the rate of fuel supplied the generator by establishing an electromagnetic signal representative of the fuel rate,
means for electromagnetically comparing the fuel signal and the second fluid pressure signal to generate a third fluid pressure signal representative of their difference,
and a fuel regulator responsive to the third signal to proportion the fuel to the water to maintain steam quality, 2. The system of claim 1 in which,
the means for electromagnetically comparing the fuel and air signals includes,
 (a) two sets of electromagnetic coils connected to the second fluid pressure so the sets will be positioned thereby,
 (b) an armature mounted to be positioned by the electromagnetic signal representative of the fuel rate so as to selectively short out the electromagnetic field linking the coils of each of the two sets,
 (c) and a motor and transducer connected to be controlled by the output of the selectively shorted coil sets to generate the third fluid pressure signal,

References Cited

UNITED STATES PATENTS

| | | | |
|---|---|---|---|
| 1,975,086 | 10/1934 | Dickey | 122—448 |
| 2,211,725 | 8/1940 | Bailey et al. | 122—448 |
| 2,217,640 | 10/1940 | Junkins | 122—448 |
| 2,774,019 | 12/1956 | Hornfeck | 236—14 X |

EDWARD J. MICHAEL, *Primary Examiner.*